US005084331A

United States Patent [19]

Afzali-Ardakani et al.

[11] Patent Number: 5,084,331

[45] Date of Patent: Jan. 28, 1992

[54] ELECTROEROSION RECORDING MEDIUM OF IMPROVED CORROSION RESISTANCE

[75] Inventors: Ali Afzali-Ardakani, White Plains; Keith S. Pennington, Somers, both of N.Y.

[73] Assignee: International Business Machines Corporation, Armonk, N.Y.

[21] Appl. No.: 657,270

[22] Filed: Feb. 11, 1991

Related U.S. Application Data

[63] Continuation of Ser. No. 300,665, Jan. 23, 1989, abandoned.

[51] Int. Cl.[5] .................... B32B 7/02

[52] U.S. Cl. .................... 428/219; 428/408; 428/452; 346/135.1

[58] Field of Search .................... 428/480, 481, 483, 339, 428/323, 327, 461, 469, 482; 204/129.1, 129.65, 129.75; 346/162, 163, 164; 430/49, 132, 276, 308, 315, 318, 525, 536, 961, 284, 274

[56] References Cited

U.S. PATENT DOCUMENTS

| | | | |
|---|---|---|---|
| 2,731,354 | 1/1956 | Wirshing . | |
| 3,945,899 | 3/1976 | Nikaido et al. | 428/13 |
| 4,082,902 | 4/1978 | Suzuki et al. | 428/457 |
| 4,172,177 | 10/1979 | Sato | 428/413 |
| 4,264,706 | 4/1981 | Sutton et al. | 430/274 |
| 4,286,048 | 8/1981 | Merrill et al. | 430/284 |
| 4,427,766 | 1/1984 | Mohr | 430/525 |
| 4,439,485 | 3/1984 | Takemura et al. | 428/323 |
| 4,465,738 | 8/1984 | Chang | 428/426 |
| 4,554,562 | 11/1985 | Afzali-Ardakani et al. | 346/135.1 |
| 4,565,759 | 1/1986 | Tsutsui | 430/66 |
| 4,567,490 | 1/1986 | Afzali-Ardakani et al. . | |
| 4,568,621 | 2/1986 | Aviram et al. | 346/135.1 |
| 4,596,733 | 6/1986 | Cohen et al. | 428/209 |
| 4,604,341 | 8/1986 | Mohr | 430/278 |
| 4,606,937 | 8/1986 | Rossler et al. | 427/121 |
| 4,606,975 | 8/1986 | Mohr | 428/469 |
| 4,617,579 | 10/1986 | Sachdev et al. . | |
| 4,622,262 | 11/1986 | Cohen . | |
| 4,689,272 | 8/1987 | Simon et al. | 428/448 |
| 4,707,433 | 11/1987 | Ogawa | 430/274 |
| 4,810,628 | 3/1989 | Schranz et al. | 430/284 |

FOREIGN PATENT DOCUMENTS

| | | |
|---|---|---|
| 0147624 | 10/1985 | European Pat. Off. . |
| 1047642 | 10/1985 | European Pat. Off. . |

OTHER PUBLICATIONS

"Surface Treatment and finishing of aluminum and Its Alloys", Wernick and Pinner, 1956.

*Primary Examiner*—Merrell C. Cashion, Jr.
*Assistant Examiner*—Robert J. Follett
*Attorney, Agent, or Firm*—Ratner & Prestia

[57] ABSTRACT

Electroerosion recording material with improved corrosion resistance provided by an overlayer of a protective lubricant composition of conductive particles of high lubricity dispersed in a partially crosslinked, water insoluble, hydrophilic polymeric binder.

13 Claims, 1 Drawing Sheet

ELECTROEROSION RECORDING MEDIUM OF IMPROVED CORROSION RESISTANCE

This application is a continuation of application Ser. No. 07/300,665 filed Jan. 23, 1989, now abandoned.

BACKGROUND OF THE INVENTION

The invention relates to electroerosion printing and to recording materials characterized by an improved hydrophilic, conductive or resistive lubricant topcoat, especially for use in the production of direct offset masters or direct negative applications.

Electroerosion printing is a well-known technique for producing markings, such as, letters, numbers, symbols, patterns, such as, circuit patterns, or other legible or coded indicia on recording material in response to an electric signal which removes or erodes material from the surface of the recording material as the result of spark initiation.

The surface which is eroded or removed to provide such indicia on the recording material is usually a thin film of conductive material which is vaporized in response to localized heating associated with sparking (arcing) initiated by applying an electric current to an electrode in contact with the surface of a recording material comprising the thin conductive film on a flexible nonconductive backing or support. In the present state of the technology the thin conductive film is usually a thin film of vaporizable metal, such as, aluminum.

Electroerosion printing is effected by the movement of a stylus or a plurality of styli relative to the surface of specially prepared recording media. Electrical writing signals are fed to the stylus to provide controlled electrical pulses which generate sparks at the surface of the recording material to selectively heat and remove by evaporation a layer of the recording material; the locations from which material is removed correspond to the indicia or images which are to be recorded.

In the course of this process, the stylus is moved relatively to a surface of the recording material and in contact with the removable layer, e.g., a thin film of vaporizable material, usually a metal, such as aluminum.

Due to the fragility of the thin conductive layer and stylus pressure, considerable scratching (undesired removal of the removable layer) is observed to take place during electroerosion printing.

It has been recognized for some time, therefore, that the use of a lubricant and/or protective overcoat on the surface of such electroerosion recording materials would be helpful to reduce scratching by the stylus. After some investigation, lubricants comprising long chain fatty acids were adopted. Even with the use of such lubricants, however, some stylus scratching of the thin aluminum film of electroerosion recording materials continues to be observed. Therefore, efforts continued to be directed to finding a superior lubricant—protective layer composition for the surface of electroerosion recording materials.

U.S. Pat. No. 4,622,262 describes the use of graphite dispersed in a water insoluble polymeric binder, for example, ethyl cellulose. Although the corrosion resistance of the film is very good, the material cannot readily be used as direct offset plate because the surface of the material is hydrophobic and the top coat can not be easily removed from the surface.

U.S. Pat. No. 4,617,579 describes the use of a hydrophilic-water soluble binder (hydroxy ethyl cellulose or the like) in the top coat. In this case although the material can be used both as negative and plate, because of the conductivity, hydrophilicity and water solubility of the top coat, it undergoes rapid corrosion of the aluminum film from fingerprinting and in humid environments. Therefore, after handling or short storage times it could not reliably be used as direct negative/direct plate (DNP).

U.S. Pat. No. 4,567,490 describes the use of fluorinated graphite and Teflon with or without addition of graphite. Although the corrosion resistance of DNP materials coated with these fluorinated compounds increases due to their low conductivity, the print quality is poor.

SUMMARY OF THE INVENTION

It has been found that improved electroerosion recording materials can be prepared by providing the aluminum surface of such materials with a protective layer of solid conductive lubricant dispersed in a water insoluble hydrophilic crosslinked polymer matrix.

The recording medium according to this invention provides use as a defect-free "direct negative" and/or "direct offset printing master" and thus has the advantage of process simplification by eliminating the need for removal of the overlayer after electroerosion recording and prior to use on the printing press as commonly practiced with conventional recording media. A further advantage of the unique protective coatings described herein is realized from application using aqueous dispersions of polymer-particulate compositions and thus avoiding the use of organic solvents.

The conductive solid lubricant may be selected from the various conductive particulate lubricants disclosed in U.S. Pat. No. 4,622,262.

The overlayer disclosed herein can be applied directly to the surface of electroerosion recording materials.

One object of the invention, therefore, is to produce electroerosion recording materials of improved resistance to stylus scratching by use of the special lubricating coatings of this invention.

Another object is to provide an abrasion-resistant recording material suitable for generation of a high quality "direct negative" which also functions as a "direct offset printing master" with no extra step involved after electroerosion recording.

Another object of the invention is to provide a superior lubricant composition which can also exhibit improved contrast when used to produce direct-negative by electroerosion printing. In such usage a dark graphite/polymer film serves to help block light that may be partially transmitted through the thin conductive film, e.g., a thin aluminum film. A further object of the present invention is to provide a lubricant composition which does not have to be removed in the production of offset masters.

Another object of this invention is to provide a superior lubricant composition which has improved corrosion resistance to fingerprinting or storage in a humid environment.

Yet another object is to provide improved electroerosion recording material having a thin, uniform, and adherent overcoat for the aluminum film for protection against damage during storage and handling.

DETAILED DESCRIPTION OF THE INVENTION

Figure 1:
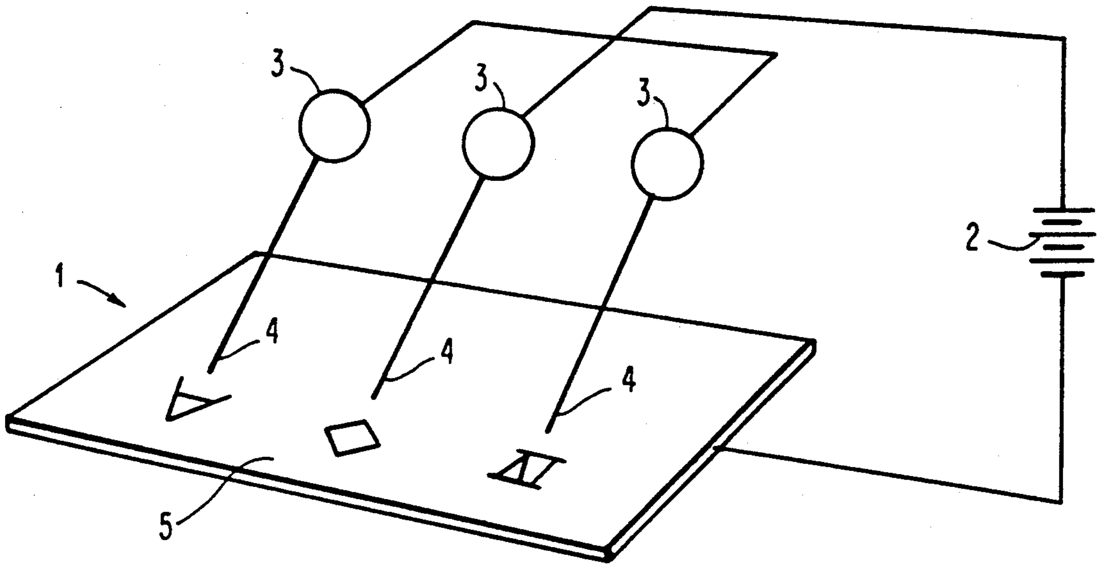
FIG. 1 of the drawings is a general schematic rendering of an illustrative electroerosion operation.

The present invention generally comprises electroerosion recording materials consisting of a flexible support preferably with an abrasion-resistant, ink-receptive layer of polymer-particulate compositions, and an electroerodible metal film such as Al with a protective coating comprising lubricating particles of good electric conductivity in special types of organic polymeric binders. Electroerosion materials for use as direct-negatives or direct masters can be prepared utilizing this invention. In general, the lubricating layer should have a density between about 2 and 30 micrograms per square centimeter since lower concentrations give inadequate lubrication and higher concentrations are too thick for good writing at low writing voltages (about 50 V) and short pulse lengths (about 3 microseconds). If more energy is applied by increasing the voltage of the writing pulse and increasing the pulse length, thicker films can be used. Also the lubricating agent binder ratio should be adjusted to avoid flake-off of the lubricating agent.

Many conductive laminar solids may be used as the particulate conductive lubricant agent for the protective layer. Preferred materials are concentrated aqueous colloidal suspension of graphite/purified carbon with average particle size less than 1 micron available from Superior Graphite Co., Acheson Colloid Co., or similar products from Graphite Product Corp. Other materials which are expected to be useful include, for example, carbon black of mean particle diameter 0.02$\mu$, solids such as ZnO, $TiO_2$, $MoS_2$, $WS_2$, $VSe_2$, $TaSe_2$, CdS, $Sb_2O_3$ and $TaS_2$; other soft compounds such as AgI, PbO, $Pb(OH)_2$, MoO, $ZnI_2$, and $PbCO_3$; and soft metal particles such as Sn, Cu, Ag, Pb, Au, Bi, Zn, Al, etc.

A typical structure comprises a flexible support such as polyethylene terephthalate (Mylar) with an abrasion-resistant base layer of polymer-particulate matrix which is preferably cross-linked, a thin conductive electroerodible film such as Al and a protective overlayer consisting of solid lubricants dispersed in a hydrophobic polymer matrix.

The lubricating top coat of this invention consists of a solid lubricant and a polymeric binder that glues the solid lubricant to the aluminum film so that it can not be easily removed either by hand or in the printer. Because electroerosion printing requires that electric current be passed from the printer head (array of 32 tungsten electrodes) to the aluminum film, the solid lubricant on the material has to be somewhat conductive and that is the reason that graphite or a mixture of graphite (conductive) and Teflon (non-conductive) is used as solid lubricant. The reason for lubricant is to reduce scratching (some times referred to as burnishing) of the aluminum film in the electroerosion process. The binder in the top coat which is used to glue the lubricant to aluminum plays an important role in the wettability of the materials. In order to be able to use the material as direct offset plate, the surface of the material must be hydrophilic. The water soluble cellulosic (hydroxy ethyl cellulose) materials make the aluminum surface much more susceptible to corrosion by finger prints or humidity of the environment. But if the binder is chosen from water insoluble polymeric materials (like ethyl cellulose), which reduces the chances of the corrosion of the aluminum film, the materials cannot be used as direct plate. This invention describes choice of a water soluble-hydrophilic binder which after partial crosslinking with potassium dichromate becomes water insoluble (while maintaining its hydrophilicity) and which can be removed easily by conventional etchants, and therefore increases the corrosion resistance of the materials at the same time it retains its dual application as direct negative and direct plate. Furthermore, this invention describes the reaction of dichromate with aluminum film which makes a conversion layer on top of the aluminum which results in significant reduction of scratching (burnishing).

The detailed description of the invention can be better appreciated by reference to the accompanying drawings. FIG. 1 illustrates schematically an electroerosion printing system 1 which includes a source of electrical energy 2, which is connected with writing control means 3 for controlling the flow (voltage and pulse length) of electrical current to styli 4 which are electrodes which contact the surface of the electroerosion recording material 5.

In operation, electric current pulses corresponding to information to be printed on the recording material 5 are transmitted through the writing control systems 3 to the styli 4. As a result, electrical discharges are generated at the surface of the recording material 5, and the temperature of the thin surface film is locally raised causing evaporation of the surface film or layer and the underlying material is exposed to produce the desired image.

Means (not shown) are provided for moving the styli 4 relative to and in contact with the surface of the recording material 5. As the styli 4 move relative to the recording material 5 and the writing control means 3 direct pulses of current to the styli of sufficient voltage to cause arcing and evaporation of a conductive layer of the material, there can be recorded desired information, patterns and graphics of any kind. It is during the movement of the styli over and in contact with the surface of the recording material that the thin film on the surface of the recording material is liable to be scratched and abraded resulting in poor writing quality and perhaps the recording of erroneous information.

Figure 2:
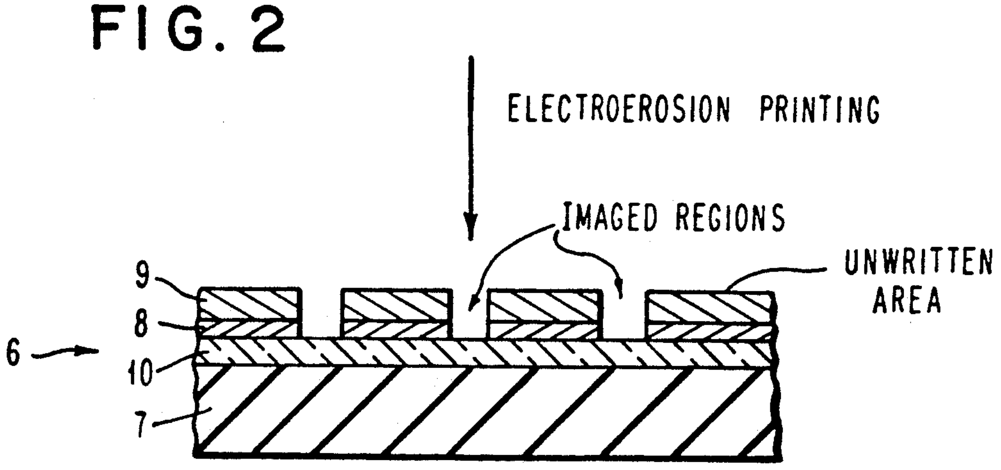
FIG. 2 of the drawings is a cross-sectional view of a direct offset master made in accordance with the invention and showing the removal of surface layers in regions where electroerosion has been effected.

Referring to FIG. 2, the electroerosion recording material of this invention 6 is shown in cross-section to comprise a support 7 of paper, polymer film, etc., a thin, conductive, evaporable layer or film 8, and a lubricant layer or film 9; optionally a tough, hard, transparent film 10 may be positioned between the support 7 and the evaporable layer 8. This intermediate film 10 preferably is of a layer of small hard particles in a suitable polymeric binder, for example, silica particles in a cellulose-acetate-butyrate (CAB) polymeric binder, or silica particles in a cross-linked polymer such as urethane cross-linked CAB, which may be light transmissive or transparent, to further reduce scratching of the material during electroerosion printing. The evaporable film 8 usually has a resistance from about 1 to 5 ohms per square centimeter and is frequently a vapor-deposited thin film of aluminum.

Where the backing or support is a light transparent or transmissive material, the resulting product can be used as a photomask or direct negative medium for the development of photosensitive materials, e.g., in the production of offset lithography masters, circuit boards, etc.

The recording material is preferably to be used as an offset master where the support is chosen to be an ink receptive material such as polyester. After imaging by electroerosion printing to expose the support layer selectively, the overlayer lubricating composition does not have to be removed, as illustrated by FIG. 2.

Electroerosion recording materials of the invention may be prepared in accordance with the following procedure:

As a support, a flexible sheet of Mylar polyester 50 micrometers thick was provided. On this support, using conventional web-coating apparatus, a coating of silica particles in a urethane cross-linked CAB binder was put down. Onto this layer there was evaporation deposited, by conventional technique, a thin conductive film of aluminum, about 400 Angstroms thick. This type of structure was used in the Examples hereinbelow, onto which the protective lubricating films were coated.

The following working examples of in situ crosslinking are described to illustrate the best mode of carrying out this invention to provide an improved recording medium and generation of a "direct offset master" and/or a "direct negative". A unique feature of this material is provided by the lubricant overlayer on the aluminum surface which is effective in preventing mechanical abrasion of the conductive film during electroerosion recording and which need not be removed prior to use of the material as an offset printing master.

EXAMPLE 1

A mixture of 2.5 g of a co-polymer of maleic acid and methylvinyl ether (Gantrez S-95, GAF Co.) with 7.0 g graphite particles and 0.50 g surfactant in 990 g of water was stirred to disperse the graphite. The DNP materials were coated with a 1% solid of the above mixture to a thickness of 2-10 microgram/square centimeter and dried at 80°-110° C. for about 0.5-1.0 minutes. The top coated materials were then treated with 0.1-1.0% aqueous solution of potassium dichromate and dried at 100° C. for 30 seconds. The resulting materials were water insoluble but also had a water wettable surface which could be used as direct plate. The corrosion resistance of the latter was increased 20-50 times compared with that of standard DNP.

Also, due to the formation of a conversion layer, the burnishing and scratching of the material is reduced by a factor of three to four over that of a film not treated with dichromate.

EXAMPLE 2

In another experiment 40.0 g Graphite (ElectroDag 191, Acheson Industries) was mixed with 2.2 g of water dispersed Teflon (Teflon 30, DuPont Co.) and 2.7 g Gantrez S-95 in 1050 g of $H_2O$ and coated on DNP materials and after drying it was treated with 0.1-1.0% aqueous potassium dichromate to give the water insoluble water wettable surface which had even better corrosion resistance than the previous Example.

Although potassium dichromate solution is the preferred reagent for crosslinking of Gantrez S-95, there are other inorganic reagents which are capable of doing the same. As an example, aqueous solutions of aluminum salts (aluminum acetate and nitrate) were also tried successfully to crosslink the Gantrez and produce a water insoluble and water wettable surface.

We claim:

1. Electroerosion recording material with improved corrosion resistance comprising:
   - a flexible non-conductive support layer;
   - a thin conductive layer on said support layer, said conductive layer capable of being removed in selected areas thereof by an electroerosion recording process;
   - a conversion layer on said conductive layer formed by the reaction of a dichromate with said conductive layer; and
   - an overlayer of a protective lubricant composition above said conversion layer, said lubricant composition comprising conductive lubricant particles dispersed in a partially cross-linked water insoluble hydrophilic polymeric binder comprising a copolymer of maleic acid and methylvinylether, said overlayer having a density of about 2 to 30 micrograms/cm$^2$.

2. A material of claim 1 in which the copolymer is crosslinked with a dichromate.

3. A material of claim 2 in which the crosslinking compound is potassium dichromate.

4. A material of claim 1 in which the conductive particles are graphite particles.

5. A material of claim 1 in which the support layer is a hydrophobic polymer such that, after electroerosion of the conductive layer, the material may be utilized in direct offset master applications.

6. A material of claim 1 further comprising a thin hard layer of cross-linked polymer between said support layer and said conductive layer, said layer serving to increase the resistance to scratching of said conductive layer during electroerosion recording.

7. A material of claim 6 in which said thin hard layer is filled with silica particles.

8. A material of claim 1 in which the overlayer density is from about 2 micrograms per square centimeter to about 10 micrograms per square centimeter.

9. A material of claim 1 in which the non-conductive support layer is a polyester and the conductive layer is aluminum.

10. A material of claim 1 further comprising non-conductive lubricant particles in the overlayer.

11. A method for preparing electroerosion printing material comprising depositing a layer of lubricating top coat on an aluminum film/polyester substrate base, said top coat being a copolymer of maleic acid and methlvinylether, and crosslinking said top coat in situ.

12. A method of claim 11 in which the crosslinking is by potassium dichromate.

13. A material of claim 1 in which the conductive layer has a resistance of from about 1 to about 5 ohms per square centimeter.

* * * * *